(12) United States Patent
Shpak

(10) Patent No.: US 11,910,276 B2
(45) Date of Patent: Feb. 20, 2024

(54) RAPID DETECTION OF MOBILE STATION LOCATIONS USING WI-FI

(71) Applicant: Deeyook Location Technologies Ltd., Tel Aviv (IL)

(72) Inventor: Eran Shpak, Tel Aviv (IL)

(73) Assignee: DEEYOOK LOCATION TECHNOLOGIES LTD., Tel Aviv (IL)

( * ) Notice: Subject to any disclaimer, the term of this patent is extended or adjusted under 35 U.S.C. 154(b) by 264 days.

(21) Appl. No.: 17/493,893

(22) Filed: Oct. 5, 2021

(65) Prior Publication Data

US 2023/0107146 A1  Apr. 6, 2023

(51) Int. Cl.
*H04W 4/029* (2018.01)
*H04W 84/12* (2009.01)
*H04W 16/28* (2009.01)
*H04L 1/1607* (2023.01)

(52) U.S. Cl.
CPC ........... *H04W 4/029* (2018.02); *H04L 1/1607* (2013.01); *H04W 16/28* (2013.01); *H04W 84/12* (2013.01)

(58) Field of Classification Search
CPC ..... H04W 4/029; H04W 16/28; H04W 84/12; H04W 4/80; H04W 64/006; H04W 4/02; H04L 1/1607
See application file for complete search history.

(56) References Cited

U.S. PATENT DOCUMENTS

| | | |
|---|---|---|
| 2013/0091288 A1 | 4/2013 | Shalunov et al. |
| 2013/0308618 A1 | 11/2013 | Panneerselvam |
| 2015/0204964 A1* | 7/2015 | Hirano .................... G01S 5/12 370/252 |
| 2017/0223657 A1 | 8/2017 | Sen et al. |
| 2017/0234962 A1 | 8/2017 | Yang et al. |
| 2018/0343554 A1* | 11/2018 | Ouzieli ................. H04W 8/005 |
| 2020/0088837 A1* | 3/2020 | Kim ...................... H04W 64/00 |
| 2021/0120586 A1 | 4/2021 | Cariou et al. |
| 2021/0120599 A1 | 4/2021 | Cariou et al. |
| 2021/0251003 A1 | 8/2021 | Shpak |
| 2023/0164831 A1* | 5/2023 | Kim ........................ H04W 4/06 370/329 |

FOREIGN PATENT DOCUMENTS

WO    2021136985 A1    7/2021

OTHER PUBLICATIONS

IEEE 802.11-2016, "Part 11: Wireless LAN Medium Access Control (MAC) and Physical Layer (PHY) Specifications," IEEE Standards Association, IEEE Computer Society, sections 9.3.3.10, pp. 706-708; 9.3.3.11, pp. 708-712; 10.3.2.3.3, pp. 1307-1308; 11.1.4.3, pp. 1591-1596; Dec. 14, 2016.
International Application # PCT/IB2022/058303 Search Report dated Dec. 15, 2022.

* cited by examiner

*Primary Examiner* — Marcos L Torres
(74) *Attorney, Agent, or Firm* — Kligler & Associates Patent Attorneys Ltd.

(57) ABSTRACT

A method for communication includes identifying a media access control (MAC) address of a mobile station of interest. Independently of receiving any probe request frame from the mobile station, a probe response frame addressed to the identified MAC address is transmitted over a wireless local area network (WLAN). An acknowledgment of the probe response frame is received from the mobile station and is used in ascertaining a location of the mobile station.

25 Claims, 3 Drawing Sheets

RAPID DETECTION OF MOBILE STATION LOCATIONS USING WI-FI

FIELD OF THE INVENTION

The present invention relates generally to wireless communication systems, and particularly to methods for localization based on wireless network signals.

BACKGROUND

Various techniques are known in the art for finding the location of a mobile wireless transceiver, such as a cellular telephone. For example, nearly all cellular telephones now have a Global Positioning System (GPS) receiver, which derives location coordinates from signals received from geostationary satellites. Because of its dependence on weak satellite signals, however, GPS works poorly, if at all, indoors and in crowded urban environments. Cellular networks are also capable of triangulating telephone location based on signals received or transmitted between the cellular telephone and multiple cellular antennas, but this technique is inaccurate and unreliable.

U.S. Patent Application Publication 2021/0251003, whose disclosure is incorporated herein by reference, describes a method for location finding in which a first station in a wireless network detects a beacon transmitted over the wireless network by a second station having multiple antennas. In response to the beacon, a request-to-send (RTS) frame is transmitted over the wireless network using a multi-carrier modulation scheme from the first station to the second station. The first station receives a clear-to-send (CTS) frame transmitted over the wireless network, in response to the RTS frame, by the second station via the multiple antennas using the multi-carrier modulation scheme, and estimates an angle of transmission departure from the second station to the first station based on the received CTS frame.

There are billions of wireless communication devices deployed around the world with Wi-Fi capabilities. (The term "Wi-Fi" refers to wireless local area network (WLAN) devices and systems that operate in accordance with standards in the IEEE 802.11 family.) A mobile Wi-Fi communication device is commonly referred to as a mobile station. Each mobile station has a unique media access control (MAC) address, which it uses in sending and receiving data frames (also referred to as packets) over a WLAN.

To transmit and receive data over a WLAN, the mobile station must first associate itself with a wireless access point (AP). Each AP is identified by its own MAC address, known as a basic service set identifier (BSSID). To find an AP with which to associate, the mobile station may scan passively for beacon frames transmitted by APs in its vicinity. Alternatively, the mobile station may scan actively by transmitting probe request frames. The source address of these probe request frames is set to the MAC address of the mobile station. APs receiving a probe request frame respond by transmitting a probe response frame addressed to the MAC address of the mobile station and indicating the BSSID of the AP. The mobile station responds immediately with an acknowledgment frame and then may initiate a subsequent exchange of frames to associate the mobile station with the AP.

Details of the probe request and response procedure are described, for example, in section 10.1.4.3 of the IEEE 802.11-2016 standard, while the probe request and probe response frame formats are described in sections 8.3.3.9 and 8.3.3.10 of this standard. One of the requirements stated in the standard is that the acknowledgment of the probe response must be transmitted within the "SIFS" time after receiving the probe response at the mobile station (in accordance with section 10.3.2.3.3 of the IEEE 802.11 standard). "SIFS" refers to the "Short Interframe Space," which is about 10 μs or less according to current IEEE 802.11 standards. Because of this strict timing requirement, the acknowledgment function is commonly implemented in hardware logic within the MAC interface circuits of the mobile station.

SUMMARY

Embodiments of the present invention that are described hereinbelow provide improved methods and systems for finding the location of a mobile communication station. In the context of the present description and in the claims, the terms "finding the location" and "ascertaining the location" of an object, such as a mobile station, can mean simply detecting whether the object is present in a certain area, although in some cases the location may be found or ascertained with greater precision.

There is therefore provided, in accordance with an embodiment of the invention, a method for communication, which includes identifying a media access control (MAC) address of a mobile station of interest. Independently of receiving any probe request frame from the mobile station, a probe response frame addressed to the identified MAC address is transmitted over a wireless local area network (WLAN). An acknowledgment of the probe response frame is received from the mobile station. A location of the mobile station is ascertained responsively to the received acknowledgment.

In some embodiments, transmitting the probe response frame includes transmitting probe response frames over multiple frequency channels of the WLAN. In one such embodiment, transmitting the probe response frames includes scanning sequentially over the channels of the WLAN, and transmitting a respective probe response frame over each of the channels until the acknowledgment is received.

Typically, the acknowledgment is received within 10 μs of transmitting the probe response frame. In a disclosed embodiment, ascertaining the location includes identifying the mobile station as a sender of the acknowledgment responsively to receiving the acknowledgment within 10 μs of transmitting the probe response frame, bearing the address of the originating probe response.

In some embodiments, ascertaining the location includes identifying that the mobile station is located within a communication range of a receiver that receives the acknowledgment.

Alternatively or additionally, ascertaining the location includes estimating an angular direction of arrival from the mobile station based on a radio signal conveying the acknowledgment. In one embodiment, transmitting the probe response frame comprises transmitting probe response frames addressed to the identified MAC address from multiple different positions (using one or multiple sources), and estimating the angular direction of arrival from the mobile station includes finding respective angular directions from the mobile station to the multiple different positions based on acknowledgments received at the multiple different positions, and finding location coordinates of the mobile station by triangulation of the respective angular directions. Additionally or alternatively, the acknowledgment is received by receivers at multiple different positions, and estimating the angular direction to the mobile station includes finding respective angular directions of arrival from the mobile station to the multiple different positions based on the acknowledgments received at the multiple different positions, and finding location coordinates of the mobile station by triangulation of the respective angular directions.

In a disclosed embodiment, transmitting the probe response includes transmitting a first orthogonal frequency-domain multiplexing (OFDM) signal, and receiving the acknowledgment includes receiving a second OFDM signal in response to the first OFDM signal, and ascertaining the location includes processing the second OFDM signal in order to find an angle of arrival of the acknowledgment.

There is also provided, in accordance with an embodiment of the invention, apparatus for communication, including a wireless transceiver, which is configured to identify a media access control (MAC) address of a mobile station of interest and, independently of receiving any probe request frame from the mobile station, to transmit a probe response frame addressed to the identified MAC address over a wireless local area network (WLAN), and to receive an acknowledgment from the mobile station of the probe response frame. A processor is configured to ascertain a location of the mobile station responsively to the received acknowledgment.

There is additionally provided, in accordance with an embodiment of the invention, a communication system, including a plurality of wireless tags, which are configured to be fixed to respective items, each tag having a respective media access control (MAC) address that is defined for communication over a wireless local area network (WLAN). A wireless transceiver is configured to identify the respective MAC address of a tag that is fixed to an item of interest and, independently of receiving any probe request frame from the transceiver, to transmit a probe response frame addressed to the identified MAC address over the WLAN, and to receive an acknowledgment to the probe response frame from the tag. A processor is configured to ascertain a location of the item of interest responsively to the received acknowledgment.

The present invention will be more fully understood from the following detailed description of the embodiments thereof, taken together with the drawings in which:

DETAILED DESCRIPTION OF EMBODIMENTS

Figure 1:
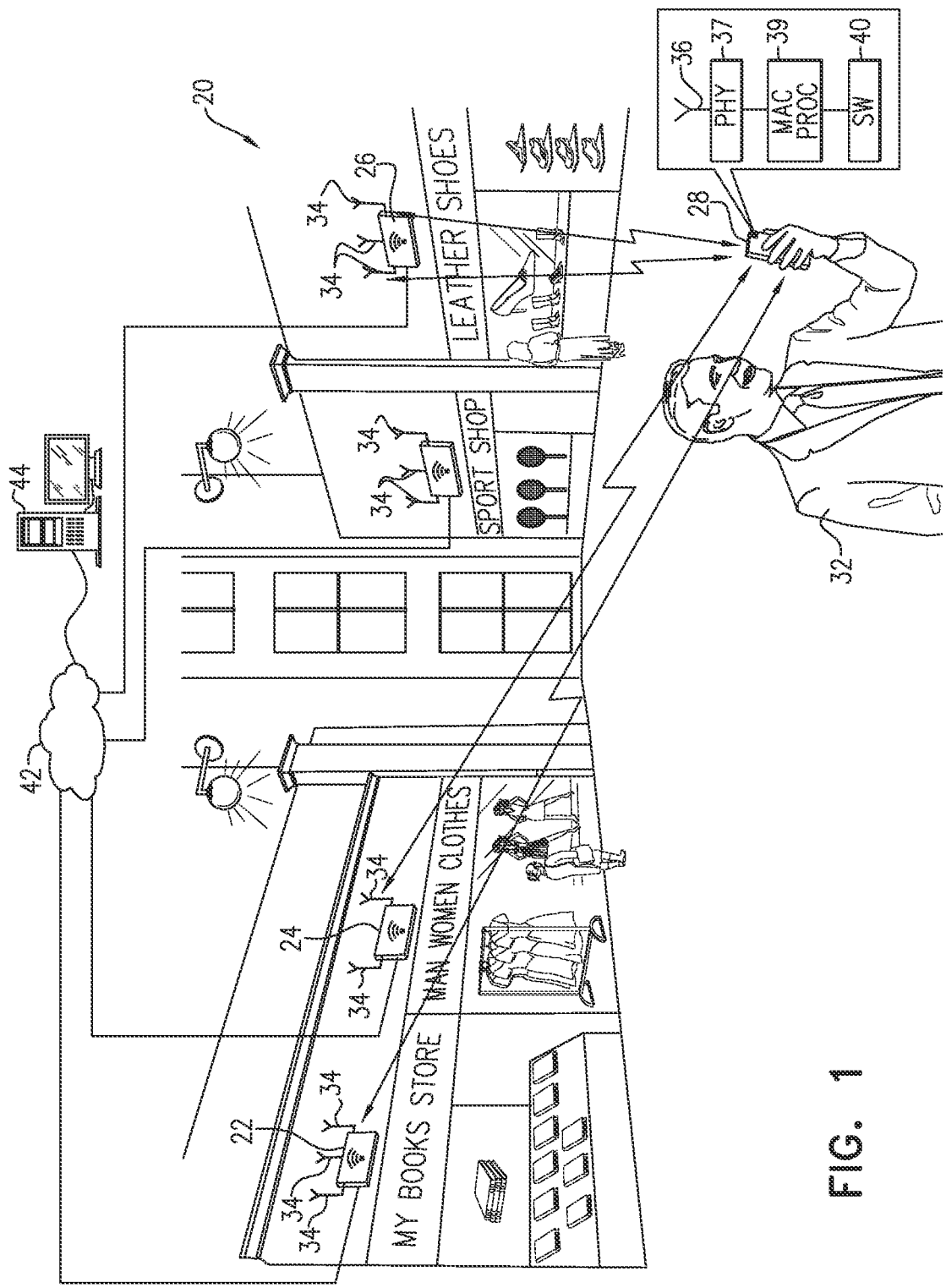
FIG. 1 is schematic, pictorial illustration of a system for wireless location finding, in accordance with an embodiment of the invention.

Ordinarily, the MAC interface logic in a wireless mobile station filters incoming data frames according to the destination MAC address and the source BSSID specified in the frame header: When the MAC destination address matches the MAC address of the mobile station, and the source BSSID matches the BSSID with which the mobile station is associated (assuming the mobile station is associated), the MAC logic will immediately return an acknowledgment frame and will pass the frame on to a microprocessor in the mobile station for further processing.

In the case of probe request and response frames, however, the BSSID of the AP that is going to respond to a given probe request may not be known in advance. Therefore, when a mobile station that has not yet associated with an AP receives a frame of type "probe response," the MAC interface logic in the mobile station will send an acknowledgment frame immediately as long as the MAC destination address matches the MAC address of the mobile station, regardless of the source BSSID. Furthermore, even when the mobile station is already associated with a given AP on a certain WLAN frequency channel, the mobile station may continue to send out probe request frames, potentially on other frequency channels to other APs, in order to search for neighboring APs that may, for example, give a stronger signal. In such cases, the MAC interface logic in the mobile station will likewise send acknowledgment frames in response to probe response frames whose MAC destination address matches the MAC address of the mobile station. The mobile station is prohibited from acknowledging received packets addressed to other mobile stations.

The probe request and response protocol is defined by the IEEE 802.11 standard as a three-way exchange, consisting of a probe request, probe response, and acknowledgment, and serves the purpose of a mobile station to actively find APs in its vicinity. Embodiments of the present invention, however, use only the latter part of this exchange: the probe response and the acknowledgment, independently of any probe request; and they use the protocol for an entirely different purpose: ascertaining the location of a mobile station. These embodiments take advantage of the fact that the MAC interface logic in the mobile station will respond rapidly (within less than 10 μs) with an acknowledgment of any probe response frame addressed to the MAC address of the mobile station, regardless of the source BSSID of the probe response frame, regardless of the software driving the mobile station.

Thus, an AP or other wireless transceiver may transmit an unsolicited probe response frame to the mobile station and will receive a "sign of life" from the mobile station, in the form of an acknowledgment frame, even when the mobile station is not associated with the BSSID of the AP or with any other AP. When the probe response frame is transmitted as an orthogonal frequency domain multiplexing (OFDM) signal, the mobile station will likewise respond with an acknowledgment frame in OFDM.

Embodiments of the present invention can be applied in solving a wide range of problems connected with ascertaining the location of an asset, such as a person or an item of interest. For example, a wireless transceiver can direct probe responses to the known MAC address of a mobile device belonging to a certain person in order to determine whether that person is present in a crowded location or at a disaster site, even if the mobile device is not associated with any AP. As another example, Wi-Fi transceivers with respective MAC addresses can be fixed to respective items in a large facility and then located by means of probe responses and acknowledgments. These applications require very little bandwidth, since the mobile station keeps silent by default and responds only when it receives an individually directed probe response, and thus will not overburden the wireless communication infrastructure.

Furthermore, beyond simply ascertaining whether a given mobile station is present in proximity to the wireless transceiver transmitting the probe response, the radio signal conveying the acknowledgment can be used in estimating the angular direction from the mobile station as observed by the transceiver. Thus, in some embodiments, probe responses are addressed to the MAC address of the mobile station, and acknowledgment frames from the mobile station are received at multiple different positions. (For this purpose, a wireless transceiver at each of the positions may transmit a probe response frame; or the same acknowledgment frame may be captured by multiple coordinated receivers at the different positions in response to a single probe response frame.) The angular directions of arrival of the acknowledgment frames received at the different positions can then be used in finding location coordinates of the mobile station by triangulation.

Additionally or alternatively, a wireless transceiver may address a probe response frame to a mobile station as an OFDM signal, which will cause the mobile station to respond with an acknowledgment frame in OFDM. In this case, the angle of arrival of the acknowledgment frame from the mobile station can be estimated using techniques described in PCT International Publication WO 2021/136985, whose disclosure is incorporated herein by references.

Although certain embodiments are described herein, for the sake of convenience and clarity, with reference to particular types of access points (APs) and mobile stations, the principles of the present invention are by no means limited to these particular sorts of devices. For example, the functions of the APs in the present embodiments may be carried out by any suitable wireless transceiver, either fixed or mobile, with the capability of communicating over a WLAN and implementing the present probe response and acknowledgment protocol. By the same token, the functions of the mobile station may be carried out by standard, off-shelf wireless devices or by a dedicated transceiver, such as a wireless tag, that complies with the relevant features of the 802.11 standards. All such alternative implementations are considered to be within the scope of the present invention.

FIG. 1 is schematic, pictorial illustration of a system 20 for wireless communications and location finding, in accordance with an embodiment of the invention. By way of example, FIG. 1 shows a typical environment in which multiple access points 22, 24 and 26 are deployed. (In the pictured example, each of access points 22, 24, 26, is assumed to have two or three antennas 34.) The access points communicate over a WLAN with mobile transceiver, such as a mobile station 28, which is operated by a user 32. In the pictured embodiment, mobile station 28 is shown as a smartphone; but other sorts of mobile transceivers, such as laptop and tablets computers, as well as dedicated radio tags, may be used in similar fashion and can similarly be located by access points 22, 24, 26 in the manner described hereinbelow.

Mobile station 28 has an antenna 36, which is connected to a physical layer (PHY) interface 37, comprising suitable analog and digital interface circuits, as are known in the art. Upon receiving a data frame from one of access points 22, 24, 26, PHY interface 37 demodulates and passes the digital data from the frame header and payload to a MAC processor 39, which performs data communication functions specified by the IEEE 802.11 protocols. MAC processor 39 typically comprises dedicated hardware logic, which may be hardwired or programmable, and stores a unique MAC address that is assigned to mobile station 28. MAC processor 39 filters the header fields of incoming data frames and, as appropriate, passes the data from the frames to a microprocessor 40 for further software-driven (SW) processing.

One of the functions of MAC processor 39 is to generate acknowledgment frames for transmission by PHY interface 37 to the AP from which an incoming frame was received. As noted earlier, the 802.11 standards generally require that these acknowledgment frames be transmitted by mobile station 28 immediately after receiving the incoming frame that is to be acknowledged, and the acknowledgment is typically transmitted within about ten microseconds. For example, when mobile station 28 is associated with AP 22, MAC processor 39 filters data in the headers of incoming frames to detect frames from the BSSID of AP 22 that are addressed to the MAC address of mobile station 28, and generates acknowledgment frames in response to such incoming frames.

As another example, when mobile station 28 receives an incoming probe response frame from AP 24, with which mobile station 28 is not associated, and the probe response frame is addressed to the MAC address of mobile station 28, MAC processor 39 will generate an immediate acknowledgment frame for transmission to AP 24. MAC processor 39 may, in principle, be designed to transmit this acknowledgment only when the probe response frame is received in response to a probe request frame that mobile station 28 actually transmitted. In practice, however, the inventor has found that MAC processors in mobile communication devices deliberately opt (for example to handle broadcast probe requests in which the address or addresses of the responders is not known in advance) not to make a distinction between solicited and unsolicited probe response frames. Probe responses are intended to be sent "in response," and the 802.11 standards do not even envision the possibility of an AP transmitting a probe response frame independently of having received a probe request frame. Thus, MAC processor 39 will transmit acknowledgment frames in response to all probe response frames that are addressed to the MAC address of mobile station 28 while the mobile station is unassociated. Even when mobile station 28 is associated, for example with AP 22, for communication on a given frequency channel, MAC processor 39 will still receive and acknowledge incoming probe response frames addressed to the MAC address of mobile station 28 from other APs, such as AP 24, on the same or other frequency channels.

Microprocessor 40 typically comprises an embedded, multi-purpose microprocessor or microcontroller, which performs the functions described herein under the control of suitable software, while invoking the appropriate hardware-based functions of MAC processor 39. This software may be stored on tangible, non-transitory computer-readable media, such as optical, magnetic or electronic memory media. For example, microprocessor 40 may set the packet header filtering criteria that are applied by MAC processor 39. Typically, microprocessor 40 also performs other computing and control functions within mobile station 28, but these functions are beyond the scope of the present disclosure.

In the present embodiment, one or more of APs 22, 24, 26, transmit probe response frames that are addressed to the MAC address of mobile station 28, independently of receiving any probe request frame from mobile station 28. The APs typically transmit the probe response frames under the control of a programmable processor, such as a server 44, which communicates with the APs via a network 42. The functions of server 44 that are described herein are typically implemented in software, which may be stored on tangible, non-transitory computer-readable media, such as optical, magnetic or electronic memory media. Server 44 identifies the MAC address of mobile station 28, for example based on previous communications by the mobile station and/or on records maintained by a vendor or wireless network operator. The server instructs the APs to use this MAC address as the destination address in the probe response frames that they transmit. Alternatively, the functionality of server 44, as described here, may be integrated into one or more of APs 22, 24, 26.

Assuming mobile station 28 is located within the communication range of one of the APs, for example AP 24, and AP 24 has transmitted a probe response frame on a frequency that mobile station 28 is tuned to receive, AP 24 should receive an acknowledgment frame from mobile station 28 within 10 µs of having transmitted the probe response frame. AP 24 will thus be able to identify and report to server 44 that mobile station 28 is located within its communication range. In addition, AP 24 may be able to estimate the angular direction of arrival from the location of mobile station 28 using beamforming or direction-finding techniques that are known in the art, and may then report this angular direction to server 44.

To find the location of mobile station 28 with greater precision, server 44 may instruct multiple APs, such as APs 22 and 26, in different, respective positions, to receive acknowledgments to probe response frames addressed to the MAC address of mobile station 28. As the acknowledgment frames contain only the address of the intended recipient, and not the source MAC address, the access points or other receivers that receive these acknowledgment frames infer the identity of mobile station 28 based, for example, on the time of receipt of the acknowledgment relative to the time of transmission of the probe response. Upon receiving an acknowledgment frame from mobile station 28, each of these APs estimates the angular direction to its own position from the mobile station. Server 44 may then find location coordinates of mobile station 28 by triangulation of the respective angular directions of arrival at the participating APs.

WLANs in accordance with IEEE 802.11 standards operate on multiple different frequency channels (generally 11-13 channels in the 2.4 GHz band and at least 4-9 channels in the 5 GHz band.) To detect APs in its vicinity, mobile station 28 typically scans the tuning of its receiver over multiple frequency channels in sequence. Therefore, APs 22, 24, 26 will receive an acknowledgment frame only if they transmit a probe response frame on a frequency channel to which mobile station 28 is tuned. In general, however, APs 22, 24, 26 and server 44 have no advance knowledge of the frequency channel to which mobile station 28 is tuned at any given moment.

To address this problem, APs 22, 24, 26 transmit probe response frames over multiple frequency channels of the WLAN. In one embodiment, a given AP scans sequentially over the channels of the WLAN, and transmits a respective probe response frame over each of the channels until an acknowledgment is received. For example, an unassociated mobile station attempting to find an AP in its vicinity will typically turn on its receiver to receive signals on a given channel for a period of 102.4 milliseconds, which is the interval over which APs transmit beacons in accordance with 802.11 standards. Thus, if AP 22, for example, scans over the twenty-two frequency channels mentioned above over the course of no more than 102.4 ms and transmits a probe response frame on each channel, mobile station 28 will receive the probe response frame on the channel to which it is tuned during the period in which its receiver is turned on.

Figure 2:
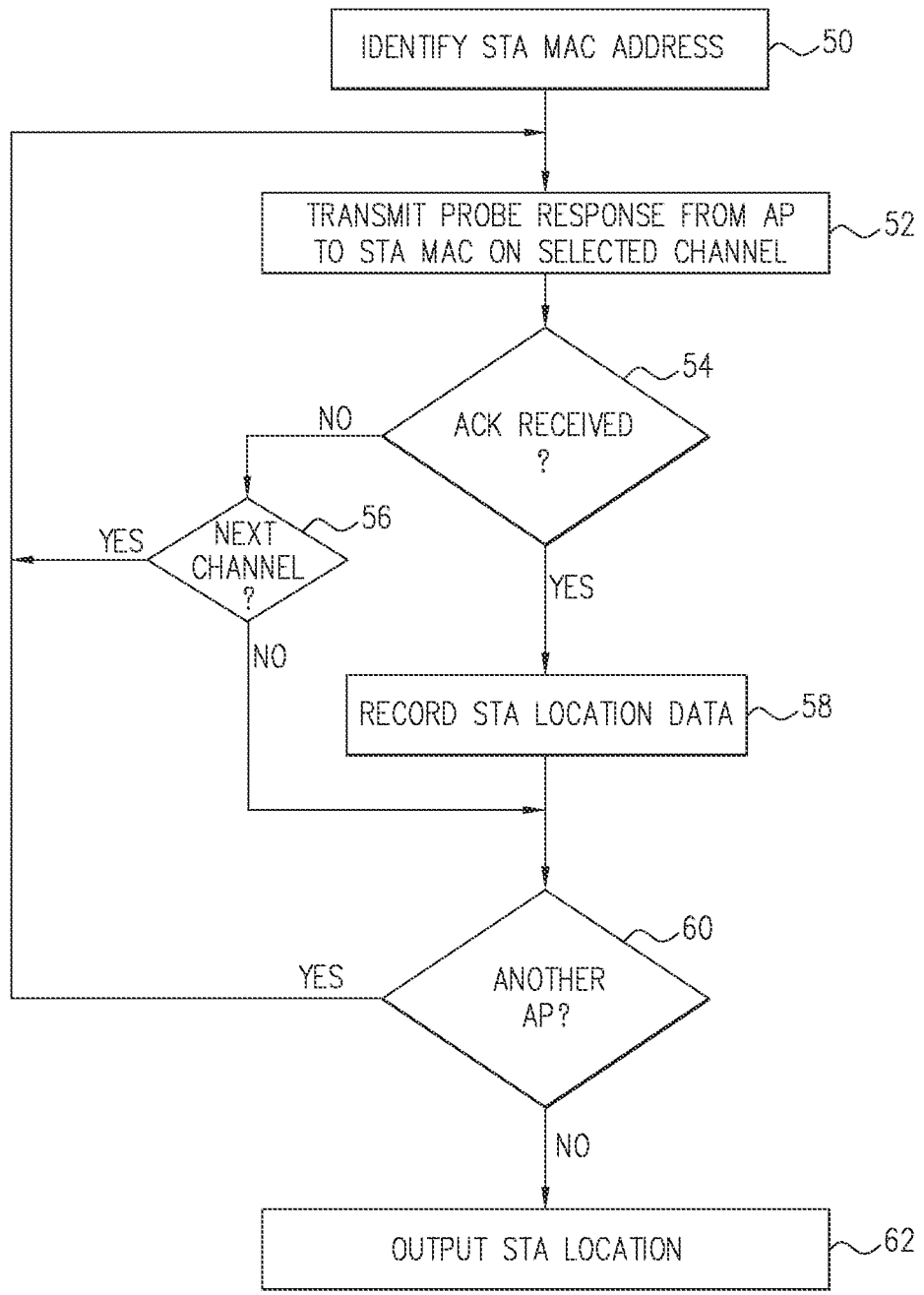
FIG. 2 is a flow chart that schematically illustrates a method for wireless location finding, in accordance with an embodiment of the invention.

FIG. 2 is a flow chart that schematically illustrates a method for wireless location finding, in accordance with an embodiment of the invention. The method is described, for the sake of concreteness and clarity, with reference to the elements of system 20 (FIG. 1), but it may alternatively be implemented using any suitable arrangement of one or more access points, including not only fixed, standard AP devices, but also other sorts of wireless transceivers, fixed or mobile, with suitable communication capabilities.

Server 44 identifies the MAC address of a mobile station, such as mobile station 28, whose location is to be ascertained, at a MAC identification step 50. Server 44 instructs an access point, such as AP 22, to transmit a probe response frame, addressed to the MAC address of mobile station 28, on a selected frequency channel, at a probe response transmission step 52. AP 22 then checks whether it has received an acknowledgment frame from mobile station 28, at an acknowledgment checking step 54. As noted earlier, the acknowledgment is expected to be received within 10 µsec or less. Furthermore, the acknowledgment may be received and processed not only by AP 22, but also by other receivers in its vicinity. If no acknowledgment is received within this time frame, AP 22 checks whether there are any further frequency channels to scan, at a channel increment step 56. If so, AP 22 switches to the next channel, and repeats steps 52 and 54.

This procedure continues until an acknowledgment is received at step 54 or until all frequency channels have been scanned. As noted earlier, it is desirable that the channel scanning be fast enough (for example, no more than a few hundred microseconds per channel) so that all the possible frequencies are covered in no more than 102.4 ms.

When AP 22 receives an acknowledgment frame at step 54, the AP conveys location data with respect to mobile station 28 to server 44, which records the data at a data recording step 58. The recorded data may simply indicate that mobile station 28 is present in the vicinity of AP 22, or it may also include directional information and/or other location information.

Server 44 checks whether there are any other APs in the area of system 20 that should attempt to locate mobile station 28, at an AP checking step 60. Server 44 will likewise go to step 60 if, at step 56, AP 22 has exhausted all available frequency channels without having received an acknowledgment. If another access point is found in the area, for example AP 24, server 44 will instruct this access point to start transmitting probe response frames at step 52, and the process described above will be repeated.

The process goes on until no further access points are available, or until server 44 determines that it has received sufficient location information. Server 44 then outputs the location of mobile station 28, at an output step 62. As noted earlier, the output may simply be in the form of an indication that mobile station 28 is present in or absent from the vicinity of a given AP, or it may include more precise location coordinates of the mobile station.

Figure 3:
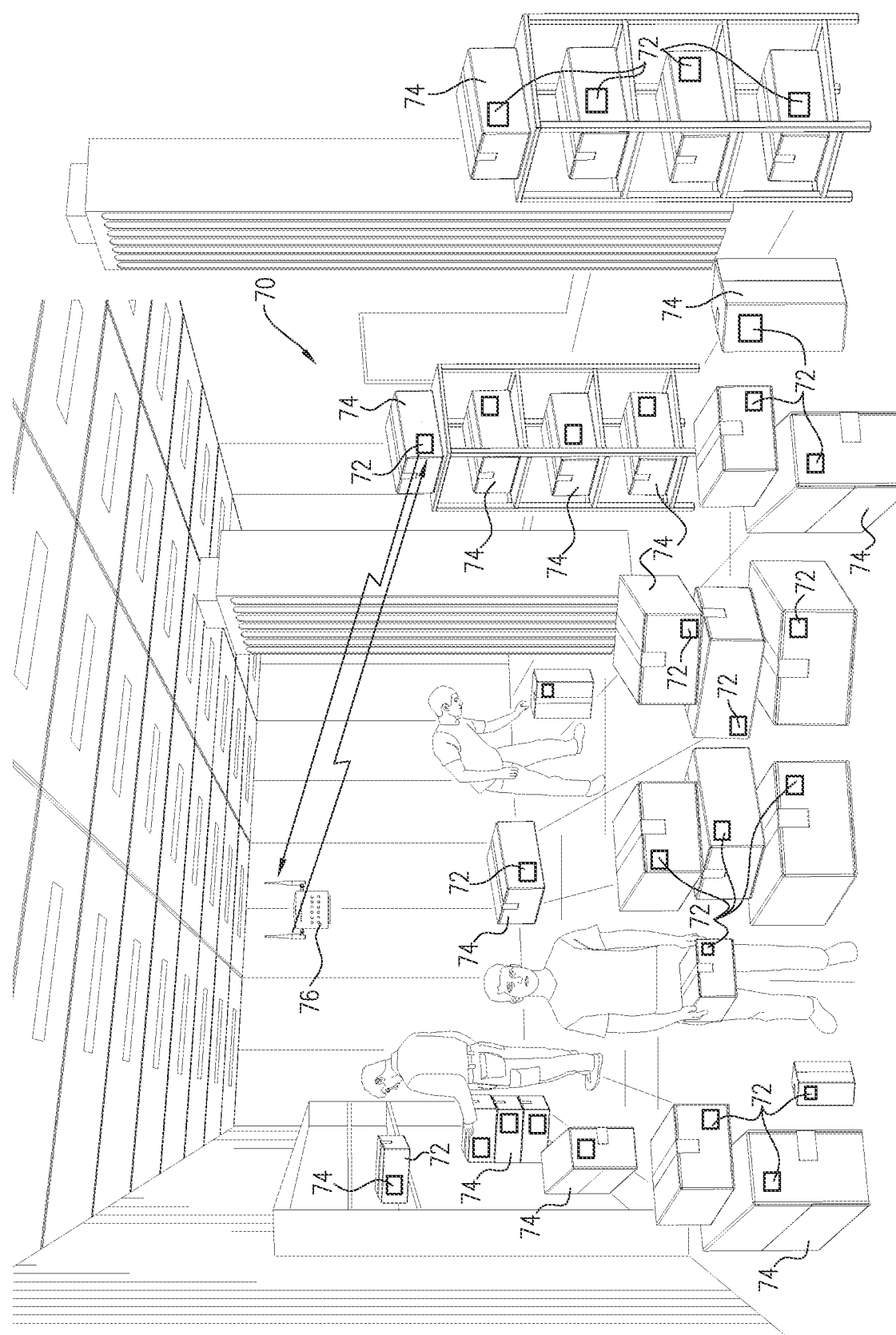
FIG. 3 is schematic, pictorial illustration of a system for wireless location finding, in accordance with another embodiment of the invention.

FIG. 3 is schematic, pictorial illustration of a system 70 for wireless location finding, in accordance with another embodiment of the invention. In this embodiment, wireless tags 72 are fixed to respective items, such as parcels 74. Each tag 72 comprises a Wi-Fi transceiver, for example a single-chip transceiver device, including an antenna and PHY and MAC interface circuits. Each tag 72 has a respective MAC address that is defined for communication over a WLAN that is compliant with an applicable IEEE 802.11 standard. Beyond this basic requirement, however, tags 72 may be only minimally configured, without any network preference or credentials, and need not be capable of transmitting any frames other than control frames such as acknowledgments. Although radio frequency identifier (RFID) tags for use in such applications are known in the art, tags 72 are advantageous in that system 70 can be implemented using existing WLAN infrastructure and standards and can thus achieve large coverage, high performance and versatility at low cost.

A wireless transceiver 76 is configured to operate as a Wi-Fi access point. Transceiver 76 receives an identification of the respective MAC address of a given tag 72 that is fixed to an item of interest, for example to one of parcels 74. Independently of receiving any probe request frame from tag 72, transceiver 76 transmits a probe response frame addressed to the MAC address of the given tag. Upon receiving an acknowledgment of the probe response frame from tag 72, transceiver 76 reports the location of the parcel in question to a processor, for example to server 44 (FIG. 1). The server is thus able to track the inventory of parcels 74 and to find the locations of parcels when required.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for communication, comprising:
   identifying a media access control (MAC) address of a mobile station of interest;
   independently of receiving any probe request frame from the mobile station, transmitting a probe response frame addressed to the identified MAC address over a wireless local area network (WLAN);
   receiving an acknowledgment of the probe response frame from the mobile station; and
   ascertaining a location of the mobile station responsively to the received acknowledgment.

2. The method according to claim 1, wherein transmitting the probe response frame comprises transmitting probe response frames over multiple frequency channels of the WLAN.

3. The method according to claim 2, wherein transmitting the probe response frames comprises scanning sequentially over the channels of the WLAN, and transmitting a respective probe response frame over each of the channels until the acknowledgment is received.

4. The method according to claim 1, wherein the acknowledgment is received within 10 μs of transmitting the probe response frame.

5. The method according to claim 4, wherein ascertaining the location comprises identifying the mobile station as a sender of the acknowledgment responsively to receiving the acknowledgment within 10 μs of transmitting the probe response frame.

6. The method according to claim 1, wherein ascertaining the location comprises identifying that the mobile station is located within a communication range of a receiver that receives the acknowledgment.

7. The method according to claim 1, wherein ascertaining the location comprises estimating an angular direction of arrival from the mobile station based on a radio signal conveying the acknowledgment.

8. The method according to claim 7, wherein transmitting the probe response frame comprises transmitting probe response frames addressed to the identified MAC address from multiple different positions, and wherein estimating the angular direction of arrival from the mobile station comprises finding respective angular arrival directions from the mobile station to the multiple different positions based on acknowledgments received at the multiple different positions, and finding location coordinates of the mobile station by triangulation of the respective angular directions of arrival.

9. The method according to claim 7, wherein the acknowledgment is received by receivers at multiple different positions, and wherein estimating the angular direction of arrival from the mobile station comprises finding respective angular directions from the mobile station to the multiple different positions based on the acknowledgments received at the multiple different positions, and finding location coordinates of the mobile station by triangulation of the respective angular directions of arrival.

10. The method according to claim 1, wherein transmitting the probe response comprises transmitting a first orthogonal frequency-domain multiplexing (OFDM) signal, and wherein receiving the acknowledgment comprises receiving a second OFDM signal in response to the first OFDM signal, and wherein ascertaining the location comprises processing the second OFDM signal in order to find an angle of arrival of the acknowledgment.

11. Apparatus for communication, comprising:
   a wireless transceiver, which is configured to identify a media access control (MAC) address of a mobile station of interest and, independently of receiving any probe request frame from the mobile station, to transmit a probe response frame addressed to the identified MAC address over a wireless local area network (WLAN), and to receive an acknowledgment from the mobile station of the probe response frame; and
   a processor, which is configured to ascertain a location of the mobile station responsively to the received acknowledgment.

12. The apparatus according to claim 11, wherein the wireless transceiver is configured to transmit probe response frames and to receive acknowledgments over multiple frequency channels of the WLAN.

13. The apparatus according to claim 12, wherein the wireless transceiver is configured to scan sequentially over the channels of the WLAN, and to transmit a respective probe response frame over each of the channels until the acknowledgment is received.

14. The apparatus according to claim 11, wherein the acknowledgment is received within 10 μs of transmitting the probe response frame.

15. The apparatus according to claim 14, wherein the processor is configured to identify the mobile station as a sender of the acknowledgment responsively to receiving the acknowledgment within 10 μs of transmitting the probe response frame.

16. The apparatus according to claim 11, wherein the processor is configured to identify, responsively to the received acknowledgment, that the mobile station is located within a communication range of the wireless transceiver that received the acknowledgment.

17. The apparatus according to claim 11, wherein the processor is configured to estimate an angular direction of arrival from the mobile station based on a radio signal conveying the received acknowledgment.

18. The apparatus according to claim 17, wherein the probe response frames addressed to the identified MAC address are transmitted from multiple different positions, and wherein the processor is configured to find respective angular directions of arrival from the mobile station to the multiple different positions based on acknowledgments received at the multiple different positions, and to find location coordinates of the mobile station by triangulation of the respective angular directions of arrival.

19. The apparatus according to claim 11, wherein the acknowledgment is received by receivers at multiple positions, and wherein the processor is configured to find respective angular directions of arrival from the mobile station to the multiple different positions based on the acknowledgments received at the multiple different positions, and to find location coordinates of the mobile station by triangulation of the respective angular directions.

20. The apparatus according to claim 11, wherein the wireless transceiver is configured to transmit the probe response as a first orthogonal frequency-domain multiplexing (OFDM) signal, which causes the mobile station to transmit the acknowledgment as a second OFDM signal in response to the first OFDM signal, and wherein the processor is configured to process the second OFDM signal in order to find an angle of arrival of the acknowledgment.

21. A communication system, comprising:

a plurality of wireless tags, which are configured to be fixed to respective items, each tag having a respective media access control (MAC) address that is defined for communication over a wireless local area network (WLAN);

a wireless transceiver, which is configured to identify the respective MAC address of a tag that is fixed to an item of interest and, independently of receiving any probe request frame from the transceiver, to transmit a probe response frame addressed to the identified MAC address over the WLAN, and to receive an acknowledgment of the probe response frame from the tag; and a processor, which is configured to ascertain a location of the item of interest responsively to the received acknowledgment.

22. The system according to claim 21, wherein the acknowledgment is received within 10 μs of transmitting the probe response frame.

23. The apparatus according to claim 22, wherein the processor is configured to identify the tag as a sender of the acknowledgment responsively to receiving the acknowledgment within 10 μs of transmitting the probe response frame.

24. The apparatus according to claim 21, wherein the processor is configured to identify, responsively to the received acknowledgment, that the tag is located within a communication range of the wireless transceiver that received the acknowledgment.

25. The apparatus according to claim 21, wherein the processor is configured to estimate an angular direction of arrival from the mobile station based on a radio signal conveying the received acknowledgment.

\* \* \* \* \*